(12) United States Patent
Kim et al.

(10) Patent No.: US 7,689,001 B2
(45) Date of Patent: Mar. 30, 2010

(54) METHOD FOR RECOGNIZING LOCATION USING BUILT-IN CAMERA AND DEVICE THEREOF

(75) Inventors: Jae-Ho Kim, Daejeon (KR); Gyung-Chul Sihn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 874 days.

(21) Appl. No.: 11/516,876

(22) Filed: Sep. 7, 2006

(65) Prior Publication Data

US 2007/0123308 A1     May 31, 2007

(30) Foreign Application Priority Data

Nov. 28, 2005     (KR) .................... 10-2005-0114022

(51) Int. Cl.
*G06K 9/00*     (2006.01)
(52) U.S. Cl. ..................... 382/103; 701/207
(58) Field of Classification Search ............... 382/100, 382/103, 106, 153; 348/113, 135; 701/207, 701/223
See application file for complete search history.

(56) References Cited

U.S. PATENT DOCUMENTS

| | | | |
|---|---|---|---|
| 2001/0032880 A1* | 10/2001 | Levine | 235/384 |
| 2003/0052529 A1* | 3/2003 | Hakkinen | 299/1.05 |
| 2004/0032972 A1* | 2/2004 | Stach et al. | 382/104 |
| 2004/0156541 A1* | 8/2004 | Jeon et al. | 382/153 |
| 2006/0002590 A1* | 1/2006 | Borak | 382/104 |
| 2006/0271274 A1* | 11/2006 | Saarikivi | 701/200 |

FOREIGN PATENT DOCUMENTS

| | | |
|---|---|---|
| KR | 10-2004-0080585 A | 9/2004 |
| KR | 10-2005-0034091 A | 4/2005 |

* cited by examiner

*Primary Examiner*—Andrew W Johns
(74) *Attorney, Agent, or Firm*—Ladas & Parry LLP

(57) ABSTRACT

The present invention relates to a location recognition device for recognizing a location by a mobile terminal having a camera and a method thereof. In the above method, the location recognition device photographs a location recognition tag storing location recognition information, and measures a distance to the location recognition tag. Subsequently, the location recognition device analyzes an image of the photographed location recognition tag, and recognizes location information corresponding to the location recognition tag and direction information of the photographed location recognition tag. Accordingly, a location of the mobile terminal is measured by using information of the measured distance and the recognized location information and direction information. In this case, an absolute location coordinate or a logic location coordinate is stored in the location recognition tag. In addition, the location recognition tags are arranged so that using the location recognition tags achieves a desired precision in a predetermined physical area.

12 Claims, 9 Drawing Sheets

METHOD FOR RECOGNIZING LOCATION USING BUILT-IN CAMERA AND DEVICE THEREOF

CROSS-REFERENCE TO RELATED APPLICATION

This application claims priority to and the benefit of Korean Patent Application No. 10-2005-0114022 filed in the Korean Intellectual Property Office on Nov. 28, 2005, the entire contents of which are incorporated herein by reference.

BACKGROUND OF THE INVENTION (a) Field of the Invention

The present invention relates to a method for recognizing a user location. More particularly, the present invention relates to a device for recognizing a current user location based on image information obtained by photographing a location recognition tag including location determination information, and a method thereof.

(b) Description of the Related Art

Methods for recognizing a location of a user in a remote place are classified as network-based methods or handset-based methods.

In network-based location recognition methods, a network system receives handset location information to recognize the handset location. Network-based location recognition methods include a method using identification information of a predetermined base station registered as a current handset location in a home location register, and a method in which various base stations measure time differences of handset signals and a predetermined location-based server determines a handset user location based on measurements including base station information and time information.

The above handset-based location determining method uses information received from a network or a satellite to determine the handset location, and it includes a method using global positioning system (GPS) signals received from a plurality of satellites through a GPS module in the handset so as to recognize a location, and a method using location determination information received from the network or combining GPS information to recognize the handset location.

However, the conventional location determination method has problems in accuracy and recognition speed. Further, it may not be used in environments including a shadow area where a signal may not reach due to frequency interference or reduction of signal strength, and an indoor area or a basement that a GPS signal may not reach.

Korean Patent Laid-Open Publication No. 2004-0080585 entitled "Robot cleaner and method for recognizing location thereof" has disclosed a method for recognizing a location in an indoor area. In the above prior art, a camera installed in a robot photographs lighting devices on a ceiling to recognize a location. However, there is a problem in that it may be impossible to recognize various locations for various purposes since the location is recognized by analyzing an arrangement pattern of the lighting devices on the ceiling and the robot location is recognized only in an indoor area.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a location recognition device for accurately and quickly recognizing a location by using a built-in camera without being affected by wireless communication environments or geographical environments and providing information on various locations, and a method thereof.

An exemplary method according to an embodiment of the present invention is to recognize a location by a mobile terminal having a built-in camera.

In the exemplary method, a) a location recognition tag storing location recognition information is photographed, b) a distance to the location recognition tag is measured, c) an image of the photographed location recognition tag is analyzed and location information corresponding to the location recognition tag is recognized, d) direction information of the photographed location recognition tag is recognized, and e) a mobile terminal location is calculated by using the distance information measured in b), the location information recognized in c), and the direction information recognized in d).

Here, the direction information recognized in d) is offset information of an offset state of the location recognition tag in relation to a base line of the mobile terminal, and the offset information is recognized by analyzing a photographing angle of the photographed location recognition tag.

In addition, in e), the mobile terminal location is calculated by a triangulation measuring algorithm by using the distance information, the location information, and the direction information corresponding to three or more location recognition tags.

An exemplary location recognition device according to an embodiment of the present invention recognizes a location by using a built-in camera. The exemplary location recognition device includes an image photographing unit, a distance measuring unit, an image analyzing unit, and a location recognizing unit. The image photographing unit photographs a plurality of location recognition tags that are arranged in a predetermined physical area, respectively stores location recognition information, and performs a digital image process. The distance measuring unit measures a distance to the location recognition tag. The image analyzing unit analyzes an image of the location recognition tag processed by the image photographing unit, and recognizes corresponding location information and direction information of the location recognition tag. The location recognizing unit recognizes a user location by using distance information measured by the distance measuring unit, and the location information and the direction information recognized by the image analyzing unit.

Here, the exemplary location recognition device further includes a tag location information storage unit storing location coordinate information of the location of the location recognition tag, and logic location coordinate information corresponding to the location coordinate information.

DETAILED DESCRIPTION OF THE EMBODIMENTS

Figure 1:
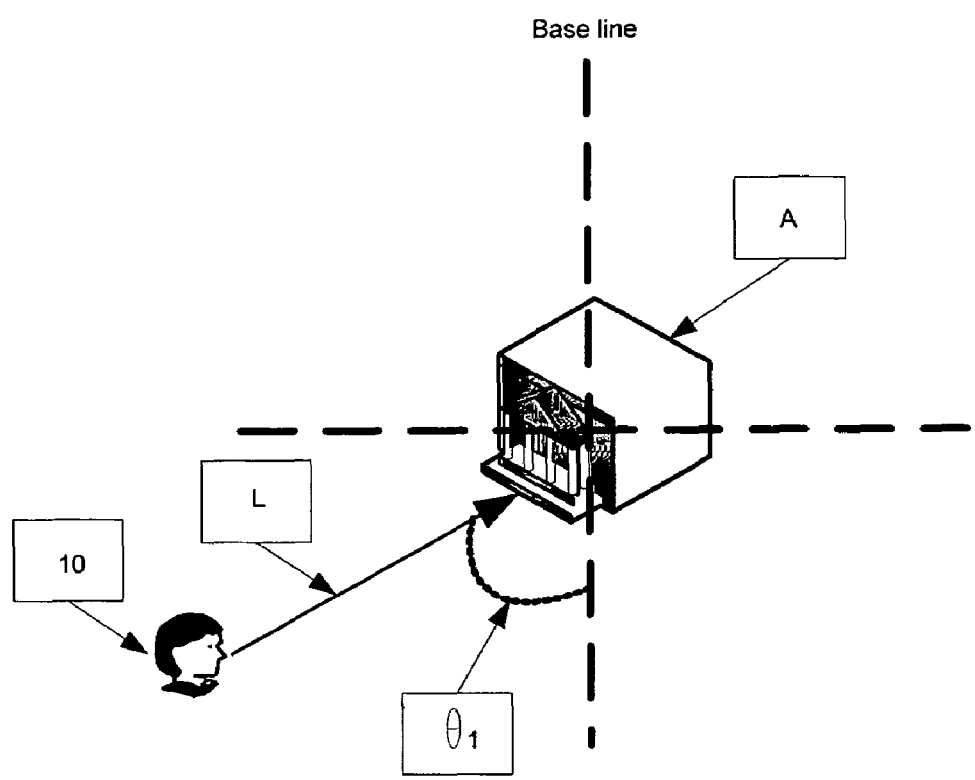
FIG. 1 shows a diagram describing a method of recognizing a location by a person using eyesight.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims which follow, unless explicitly described to the contrary, the word "comprise", and variations such as "comprises" or "comprising", will be understood to imply the inclusion of stated elements but not the exclusion of any other elements.

For better comprehension and ease of description, before describing a device for recognizing a location by using photographing information according to an exemplary embodiment of the present invention and a method thereof, a method for recognizing the location by a person will be described with reference to FIG. 1.

FIG. 1 shows a diagram describing a method of recognizing a location by a person using eyesight.

As shown in FIG. 1, when a person (10) recognizes a location reference object A using eyesight, he approximately determines his current location based on spatial location information stored in his brain through his experiences and on study of the location reference object A.

In addition, he estimates a distance L to the location reference object A according to his sense of perspective, and determines the angle θ1 of his observing position relative to a baseline of the location reference object A. Specifically, more accurate location recognition may be achieved as the number of location reference objects A around the person is increased.

Accordingly, mobile terminals having operating functions (e.g., a personal communication system (PCS), a personal digital assistance (PDA), and a cellular phone) or a notebook computer may perform location recognition when using information including a reference object for location recognition (e.g., the location reference object A), a distance to the reference object, and a direction in which the person observes the reference object.

The above location recognition method is used in the exemplary embodiment of the present invention.

Accordingly, in the exemplary embodiment of the present invention, location identifiers functioning as the location reference object A are installed or attached in a building, a basement, or a predetermined area in a predetermined arrangement, and a built-in camera in a mobile terminal photographs the location identifiers to obtain information on the location identifiers. At this time, the location identifiers include location information (e.g., absolute location coordinates directly determined by coordinate values, and logic location coordinates determined by operations), and the location information in the location identifiers in the exemplary embodiment of the present invention is interpreted by using the built-in camera in the mobile terminal. Here, the absolute location coordinates are coordinate data, and the logic location coordinates are identification information for detecting the absolute location coordinates.

In addition, a conventional distance measuring method is used to measure a distance between the location identifier and a user. The conventional distance measuring method uses a frequency reflected after transmitting radio frequencies including high frequency signals or infrared rays to a subject, and it includes a triangulation measuring method, a method for measuring a total amount of incident lights, and a method for measuring an incident time of radiated light.

The above distance measuring method is used in mobile terminals having a camera function (e.g., a camera, a PDA, a PCS, a cellular phone, and a notebook computer), and is essentially used in a camera performing an active focusing operation. Hereinafter, a mobile terminal equipped with a camera will be referred to as a "camera terminal".

In addition, an angle and a direction formed between the location reference object A and a user observing the location reference object A with respect to a base line will be referred to as an "offset angle" and an "offset direction", and offset information (including the offset angle and the offset direction) of photographed location identifier images is determined according to a position of a user observing the location reference object A, and a photographing direction of the camera terminal is determined by using the offset information.

Exemplary embodiments of the present invention will now be described with reference to FIG. 2 to FIG. 8.

Figure 2:
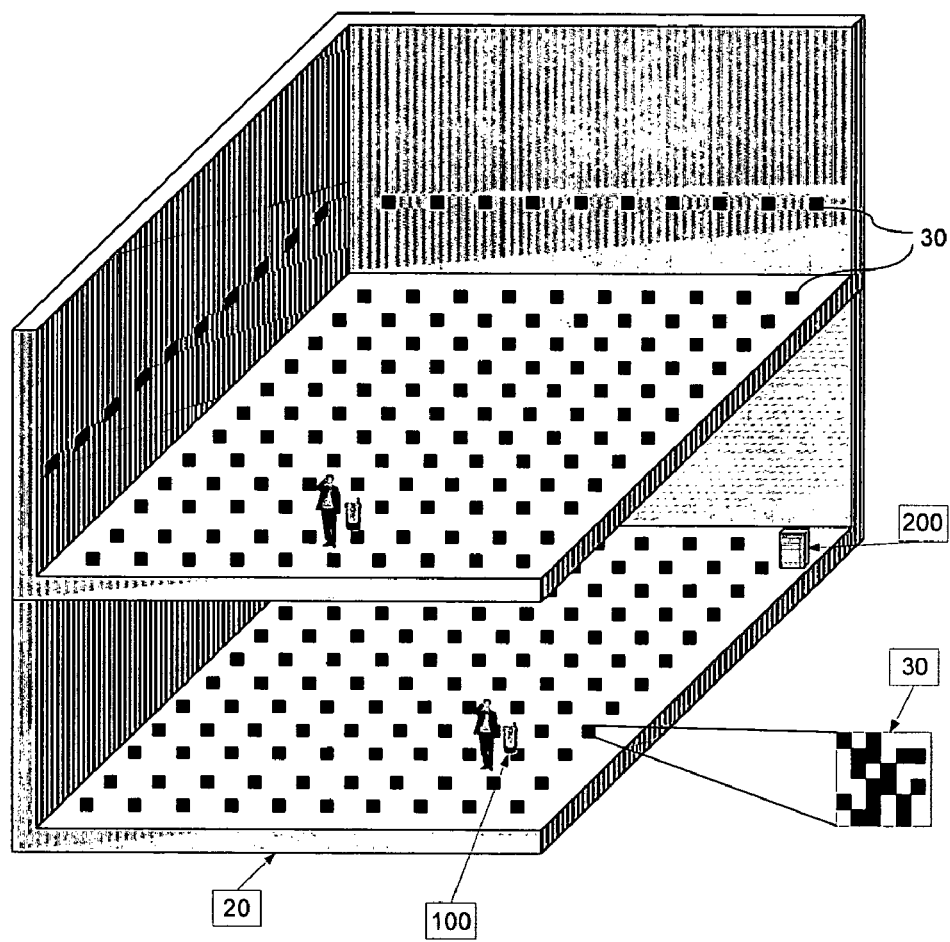
FIG. 2 shows a diagram representing an arrangement of location recognition tags according to an exemplary embodiment of the present invention.

FIG. 2 shows a diagram representing an arrangement of location recognition tags according to the exemplary embodiment of the present invention.

As shown in FIG. 2, a one-dimensional bar code or a two-dimensional bar code identified by the photographed image is used as the location identifier in the exemplary embodiment of the present invention, and hereinafter, the one-dimensional bar code or the two-dimensional bar code will be referred to as the "location recognition tag". In addition, the two-dimensional bar code as the location recognition tag will be described in the exemplary embodiment of the present invention.

More than one location recognition tag 30 is provided in an indoor area, a basement, a predetermined location, or an object, and they are positioned in appropriate locations with an appropriate density according to a desired precision of location recognition and user accessibility.

Accordingly, a user photographs one or more location recognition tags 30 of the object 20 having the location recognition tags 30 by using a camera terminal 100 so as to determine his location.

Figure 3:
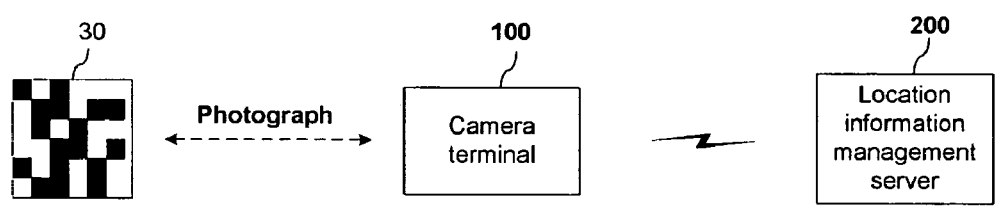
FIG. 3 shows a diagram exemplifying a network environment in which the exemplary embodiment of the present invention is applied.

FIG. 3 shows a diagram exemplifying a network environment in which the exemplary embodiment of the present invention is applied.

As shown in FIG. 3, the network environment according to the exemplary embodiment of the present invention includes the camera terminal 100 photographing the location recognition tag 30, and a location information management server 200 receiving location information wirelessly transmitted from the camera terminal 100, analyzing the location information, and storing/managing the location information.

The location information management server 200 performs a long distance wireless communication or a short distance wireless communication with the camera terminal 100 to receive the location information including image data of the location recognition tag 30 from the camera terminal 100. In addition, the location information management server 200 is connected to the Internet to transmit/receive the information to/from a terminal in a remote place. Further, the location information management server 200 may provide coordinate information when the camera terminal 100 requests the coordinate information corresponding to the location recognition tag 30.

At least one among the camera terminal 100 and the location information management server 200 interprets an absolute/logic location coordinate from an image of the location recognition tag 30 and detects offset information of the image of the location recognition tag 30, and the camera terminal 100 measures a distance to the photographed location recognition tag 30.

Figure 4:
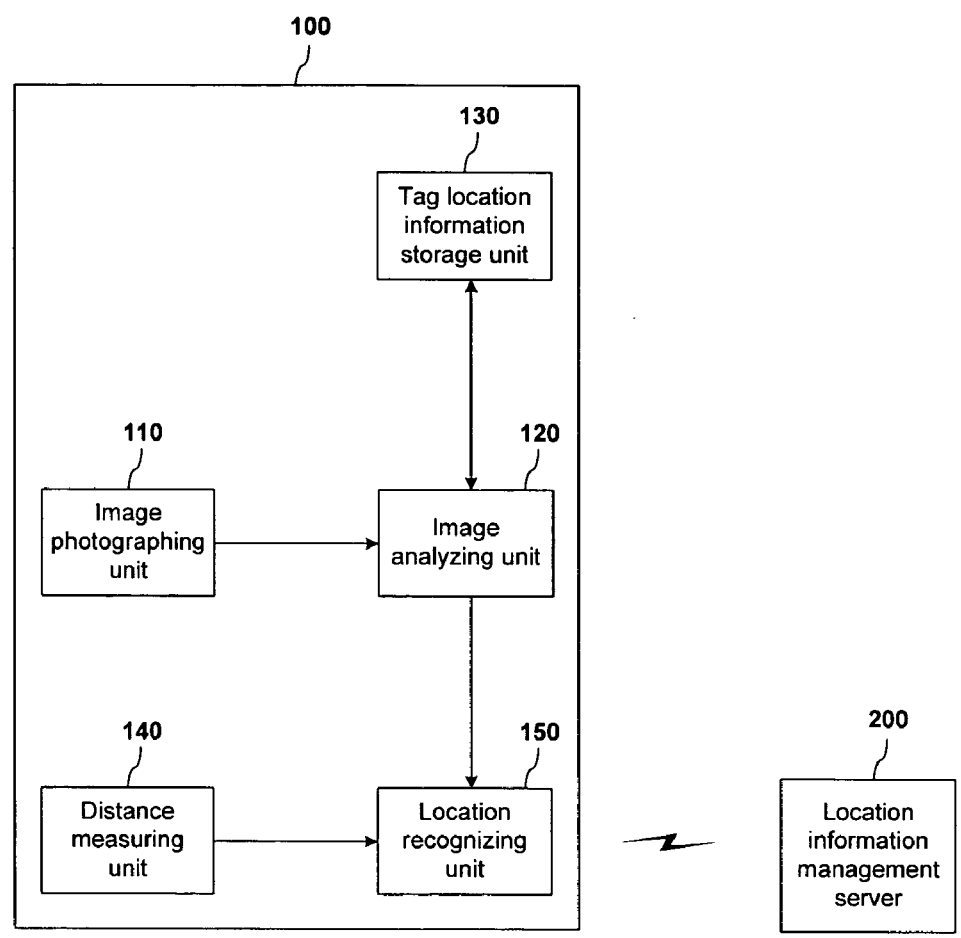
FIG. 4 shows a block diagram of a configuration of a camera terminal according to the exemplary embodiment of the present invention.

FIG. 4 shows a block diagram of a configuration of the camera terminal 100 according to the exemplary embodiment of the present invention.

As shown in FIG. 4, the camera terminal 100 according to the exemplary embodiment of the present invention includes an image photographing unit 110, an image analyzing unit 120, a tag location information storage unit 130, a distance measuring unit 140, and a location recognizing unit 150.

The image photographing unit 110 performs a camera function (i.e., a photographing function). The image photographing unit 110 forms an image from lights that are reflected from a subject, converts the image into an electrical signal, processes the signal, and generates digital image data of the subject.

The image analyzing unit 120 recognizes the location recognition tag 30 by analyzing the digital image data generated by the image photographing unit 110, and receives location information relating to the recognized location recognition tag 30 from the tag location information storage unit 130 or the location information management server 200. In addition, the image analyzing unit 120 recognizes the offset information by analyzing the image of a predetermined location recognition tag 30, and generates direction angle information on the predetermined location recognition tag 30 by using the offset information. A method for recognizing the offset information of the location recognition tag 30 by the image analyzing unit 120 will be described later in the specification.

The distance measuring unit 140 calculates a distance between the camera terminal 100 and the location recognition tag 30 by using radio frequencies including infrared rays or an ultra high frequency. A camera terminal 100 with an active focusing function has a built-in distance measuring unit, while a camera terminal 100 having a passive focusing function includes an additional distance measuring unit 140 in order to measure a distance.

In addition to the auto focusing function performed by measuring the distance, the distance measuring unit 140 may include an improved distance measuring sensor for measuring a distance to the location recognition tag 30.

The location recognizing unit 150 may calculate a current user location by using the location information and the direction angle information of the location recognition tag 30 provided from the image analyzing unit 120, and the corresponding distance information to the location recognition tag 30 provided from the distance measuring unit 140.

The location recognizing unit 150 generates current location information by using at least one among the two methods that follow.

Firstly, the image analyzing unit 120 provides location information of a first location recognition tag 30 and the distance measuring unit 140 provides information on the distance to the first location recognition tag 30. In this case, the location recognizing unit 150 finally calculates the current user location by applying the distance information following the direction angle to the coordinate information of the first location recognition tag 30.

Figure 5:
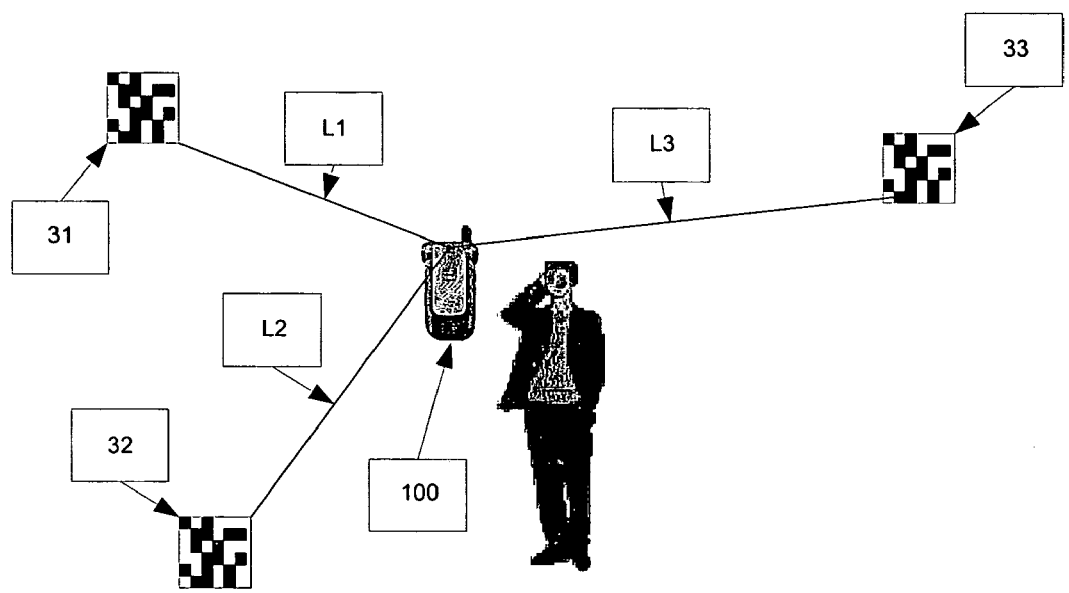
FIG. 5 shows a diagram representing a triangulation measuring method using three location recognition tags according to the exemplary embodiment of the present invention.

Secondly, the location information of three or more location recognition tags 30 is provided from the image analyzing unit 120, and distance information on each distance to the three or more location recognition tags 30 is provided from the distance measuring unit 140. In this case, as shown in FIG. 5, the location recognizing unit 150 performs a triangulation measuring algorithm by using the location information and the distance information of three location recognition tags 31, 32, and 33, and calculates the current location information.

In the triangulation algorithm, one or more triangulation points is set, each apex (i.e., each triangulation point) is observed, and a relationship between each angle and each side is calculated. Subsequently, the ratio of respective sides is compared to a distance ratio between the location recognition tags 31, 32, and 33 to calculate an accurate current location. Such a triangulation is based on a characteristic for obtaining a relative location by using some base lines, since the number of triangulation points correspond to the real scale at an observing position when there are some base lines.

The tag location information storage unit 130 provides absolute location coordinate information corresponding to the location information of the location recognition tag 30 provided from the image analyzing unit 120.

The tag location information storage unit 130 is not used when the camera terminal 100 receives the location information corresponding to the location recognition tag 30 from the location information management server 200, and it is not used either when the location recognition tag 30 has absolute location coordinate information. That is, the tag location information storage unit 130 is used when the camera terminal 100 recognizes the location information corresponding to the location recognition tag 30, or it is used when the location information in the location recognition tag 30 is the logic location coordinate.

Figure 6A:
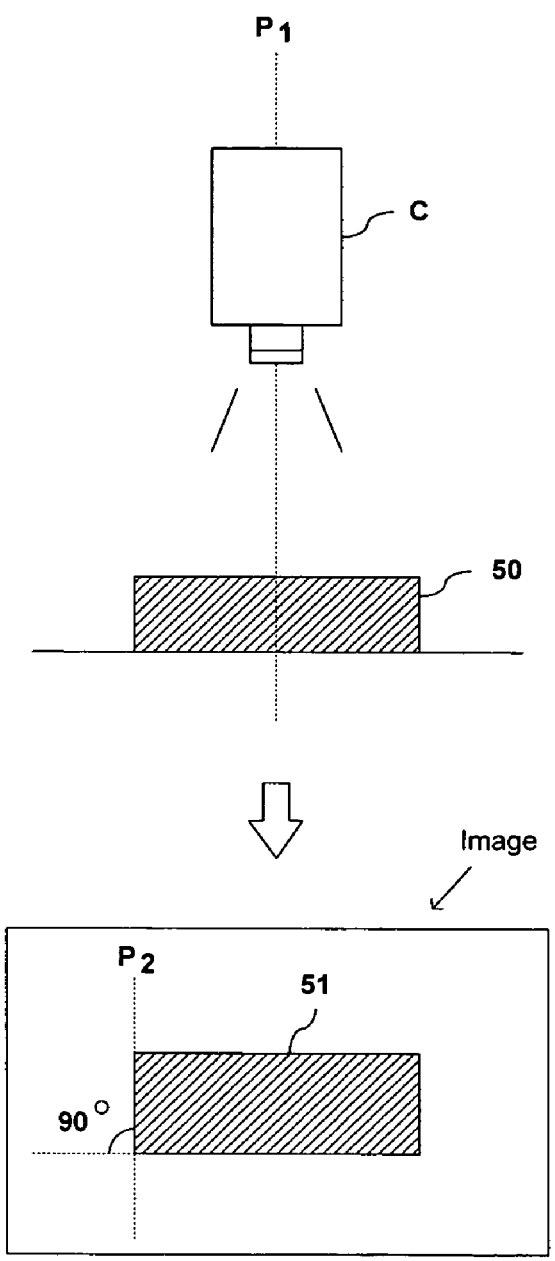
FIG. 6A and FIG. 6B show diagrams representing a relationship between a photographed image and a photographing position and an exemplary method for analyzing offset information of the image analyzing unit 120.
Figure 6B:
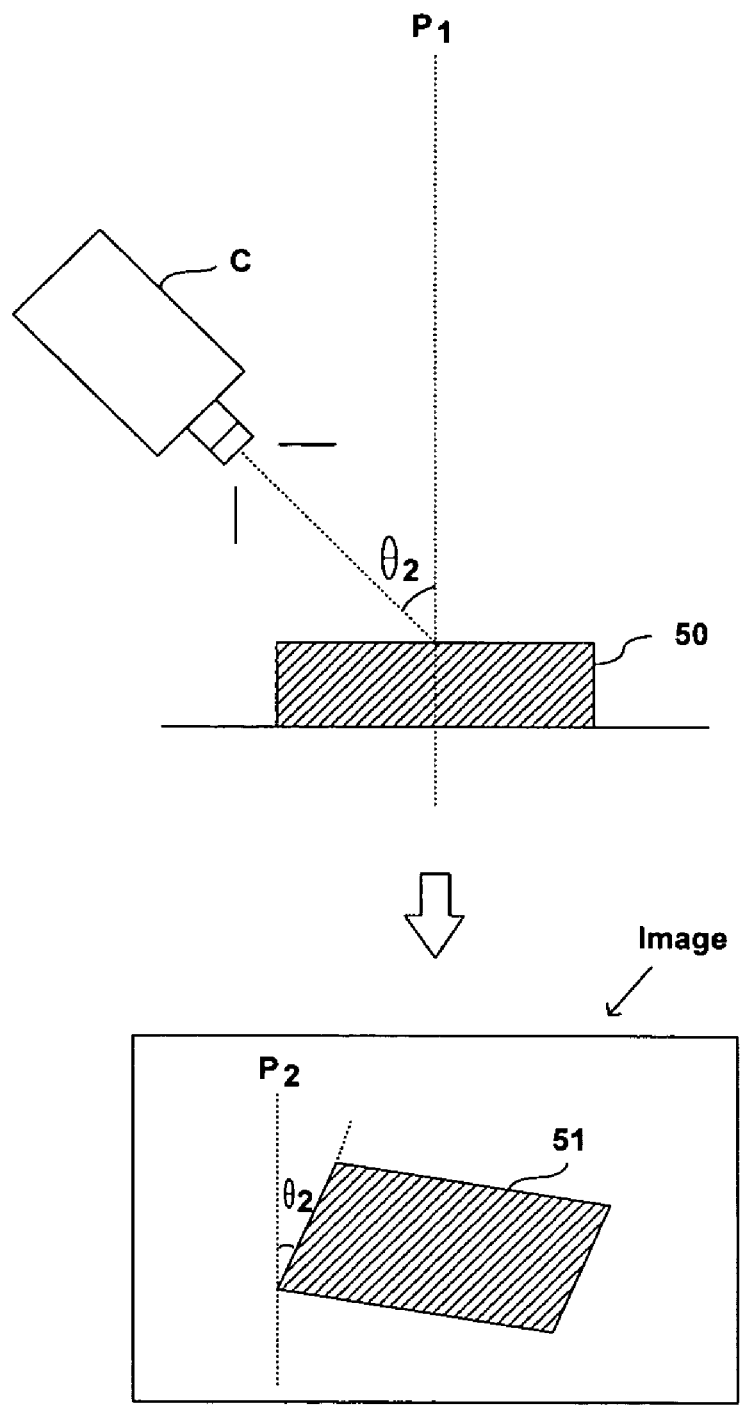

FIG. 6A and FIG. 6B show diagrams representing a relationship between a photographed image and a photographing position; and an exemplary method for analyzing offset information of the image analyzing unit 120.

As shown in FIG. 6A, when a camera C photographs a subject 50 from directly in front of the subject 50 based on an axis P1 that is normal to a surface on which the subject is positioned, an image 51 of the subject 50 is displayed on a screen of the camera C such that a contour line of the image 51 is parallel to an axis P2 corresponding to the axis P1.

However, as shown in FIG. 6B, when the camera C deviates from the axis P1 by an offset angle θ2 and photographs the subject 50, the image 51 displayed on the screen of the camera C is displayed such that the contour line thereof is offset from the axis P2 by the offset angle θ2.

Here, since the offset angle θ2 of the image increases as the camera C deviates from the axis P1, a photographing angle of the image 51 may be determined from the offset angle θ2.

In the above method according to the exemplary embodiment of the present invention, the offset information of the location recognition tag 30 photographed by the camera terminal 100 may be analyzed. That is, the image analyzing unit 120 performs an edge detection process for the digital image data output from the image photographing unit 110, recognizes the contour line of the location recognition tag 30 and a slope of the analyzed contour line, and compares the slope to a base line, so as to recognize an offset state.

Figure 7:
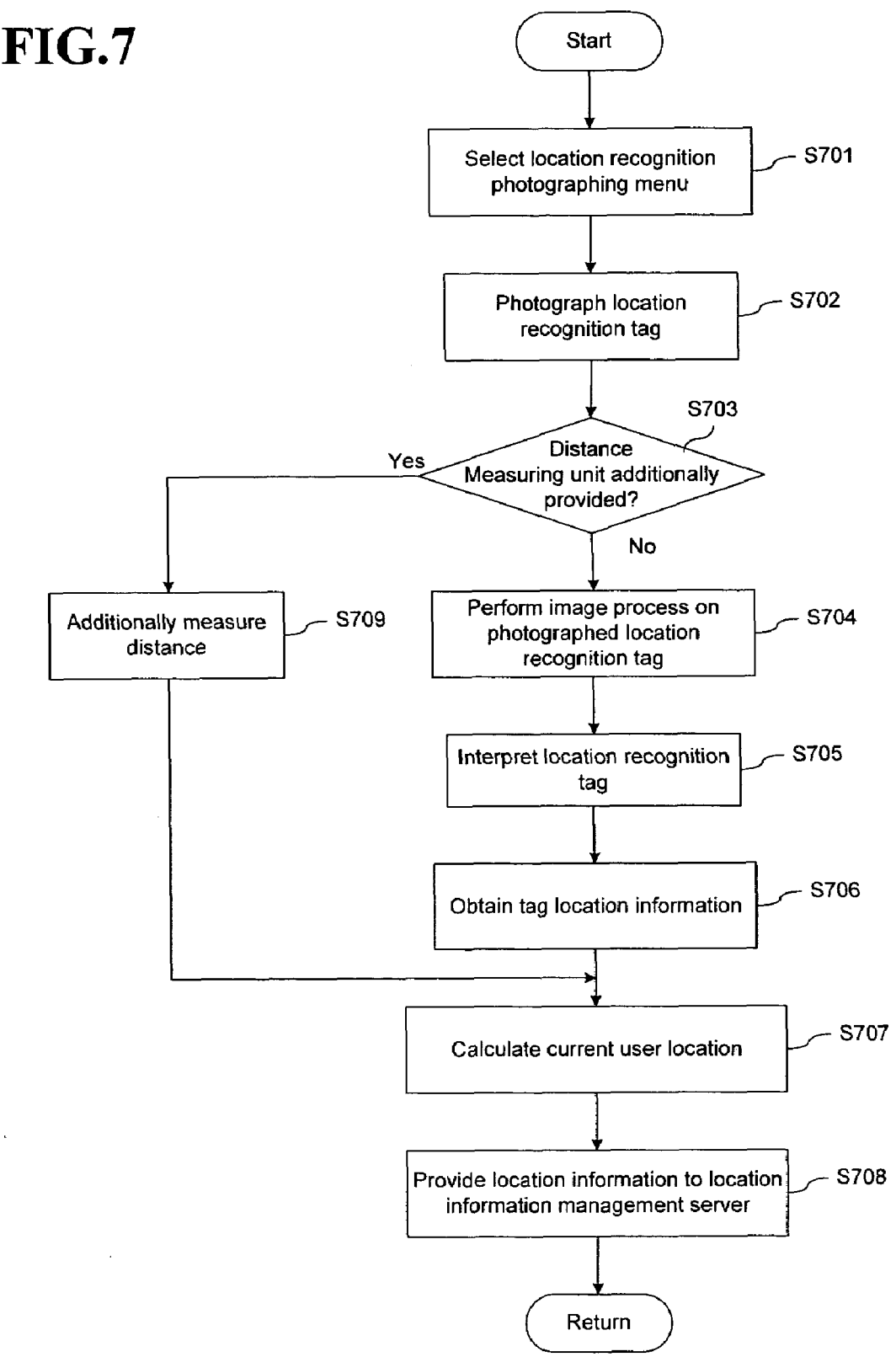
FIG. 7 shows a flowchart representing a location recognition method using a built-in camera according to a first exemplary embodiment of the present invention.

FIG. 7 shows a flowchart representing a location recognition method using photographing information according to a first exemplary embodiment of the present invention when the camera terminal 100 generates the current user location.

For better understanding and ease of description, it will be assumed that the location recognition tag 30 is printed as a two-dimensional barcode.

When a user selects a location recognition photographing menu in step S701, among menus provided by the camera terminal 100, at a predetermined location on which the location recognition tag 30 is arranged, the camera terminal 100 photographs the location recognition tag 30 selected by the user in step S702. Then, the image photographing unit 110 of the camera terminal 100 performs an image process on the photographed location recognition tag 30, generates digital image data, and provides them to the image analyzing unit 120 in step S704. At this time, the camera terminal 100 measures a distance to the location recognition tag 30 to perform a focusing operation.

Subsequently, the image analyzing unit 120 interprets the location information in the two-dimensional barcode in step S705 after reading the two-dimensional barcode of the location recognition tag 30 photographed by the image photographing unit 110, provides the interpreted location information to the tag location information storage unit 130, receives the location coordinate of the location of the two-dimensional barcode, and provides it to the location recognizing unit 150 in step S706.

Here, the step S706 is not performed when the location recognition tag 30 includes the absolute location coordinate and it is performed when the location recognition tag 30 includes the logic location coordinate. In addition, the obtainment of the location information in step S706 is basically performed by the tag location information storage unit 130. However, when the recognition of the location information is not performed by the tag location information storage unit 130, the absolute location coordinate matched to the logic location information may be obtained by accessing the location information management server 200 through the location recognizing unit 150.

The image analyzing unit 120 recognizes an offset state of the location recognition tag 30, and recognizes a photographing direction to the location recognition tag 30 (i.e., a photographing angle).

The location recognizing unit 150 receives the absolute location coordinate, the photographing angle, and the information on the distance to the location recognition tag 30, and calculates the current user location in step S707. In addition, the location recognizing unit 150 provides the current user location to the location information management server 200, and the location information management server 200 uses it in various ways in step S708.

When the camera terminal 100 additionally includes the distance measuring unit 140 in step S703, the distance measured by the distance measuring unit 140 is provided to the location recognizing unit 150 in step S709, and rather than using the distance information provided when auto focusing is performed, the location recognizing unit 150 uses the distance information provided by the distance measuring unit 140 to calculate the current location.

Figure 8:
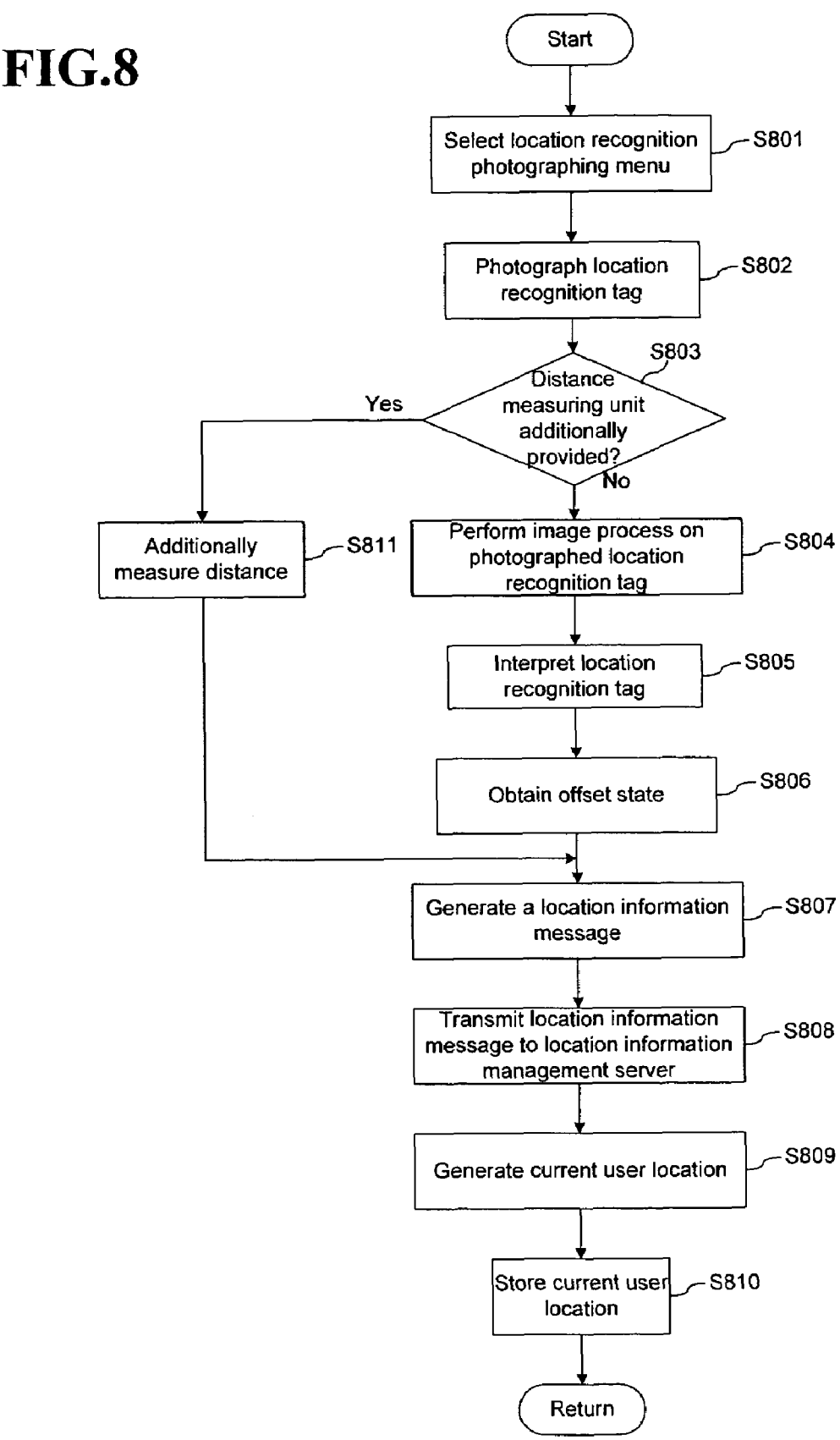
FIG. 8 shows a flowchart representing a location recognition method using the built-in camera according to a second exemplary embodiment of the present invention.

FIG. 8 shows a flowchart representing a location recognition method using the photographing information according to a second exemplary embodiment of the present invention when the location information management server 200 calculates the current user location.

As shown in FIG. 8, when a user selects a location recognition photographing menu in step S801, among menus provided by the camera terminal 100, at a predetermined location on which a location recognition tag 30 is arranged, the camera terminal 100 photographs the location recognition tag 30 selected by the user in step S802.

Then, the image photographing unit 110 of the camera terminal 100 performs an image process on the photographed location recognition tag 30, generates digital image data, and provides them to the image analyzing unit 120 in step S804. At this time, the camera terminal 100 measures a distance to the location recognition tag 30 to perform the focusing operation.

Subsequently, the image analyzing unit 120 interprets the location information in the two-dimensional barcode in step S805 after reading the two-dimensional barcode of the location recognition tag 30 photographed by the image photographing unit 110, provides the interpreted location information to the tag location information storage unit 130, receives the location coordinate of the location of the two-dimensional barcode, and provides it to the location recognizing unit 150.

Here, the step S806 is not performed when the location recognition tag 30 includes the absolute location coordinate and it is performed when the location recognition tag 30 includes the logic location coordinate. In addition, the obtainment of the location information in step S806 is basically performed by the tag location information storage unit 130. However, when the recognition of the location information is not performed by the tag location information storage unit 130, the absolute location coordinate matched to the logic location information may be obtained by accessing the location information management server 200 through the location recognizing unit 150.

In addition, the image analyzing unit 120 recognizes an offset state of the location recognition tag 30 and a photographing direction to the location recognition tag 30 (i.e., a photographing angle), and provides such to the location recognizing unit 150 in step S806.

Subsequently, the location recognizing unit 150 generates a location information message including the received distance information, the photographing information, and the tag recognition information in step S807, and transmits it to the location information management server 200 in step S808.

Then, the location information management server 200 receives the information on the three or more photographed location recognition tags 30, calculates the user location through the triangular algorithm by using the information on the absolute location coordinate, the photographing angle, and the distance to the location recognition tag 30, and stores it in step S810.

In addition, when the camera terminal 100 additionally includes the distance measuring unit 140 in step S803, the distance measured by the distance measuring unit 140 is provided to the location recognizing unit 150 in step S807, and the location recognizing unit 150 provides the distance information provided by the distance measuring unit 140, instead of the distance information provided when the auto focusing is performed, to the location information management server 200.

In the described exemplary embodiment of the present invention, while the location recognition tag 30 has been exemplified as a two-dimensional bar code, a one-dimensional bar code may be applied in a like manner. In this case, since the one-dimensional bar code itself may not include the coordinate information, it is required to perform a process for obtaining the absolute location coordinate corresponding to the one-dimensional bar code by using the tag location information storage unit 130 or the location information management server 200.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

According to the exemplary embodiment of the present invention, since a cheap location recognition tag printed on normal paper may be used along with a built-in camera in a terminal, a cost for forming a location recognition system is relatively reduced.

In addition, since the location recognition is performed based on a camera image that is similar to human vision, the location recognition tag may be accurately and quickly recognized, the location recognition operation corresponding to human vision and ability may be performed, and errors occurring when performing the location recognition may be corrected.

Further, since the logic location coordinate information, in addition to the absolute location coordinate information, may be applied to the location recognition tag, various applications may be performed by recognizing various logic location coordinates.

What is claimed is:

1. A method for recognizing a location by a mobile terminal having a built-in camera, the method comprising:
   a) photographing a location recognition tag storing location recognition information;
   b) measuring a distance to the location recognition tag;
   c) analyzing an image of the photographed location recognition tag, and obtaining location information corresponding to the location recognition tag;
   d) obtaining direction information of the photographed location recognition tag; and
   e) calculating a mobile terminal location by using the distance information measured in b), the location information obtained in c), and the direction information obtained in d).

2. The method of claim 1, wherein the direction information obtained in d) is offset information of an offset state of the location recognition tag based on the mobile terminal, and the offset information is obtained by analyzing a photographing angle of the photographed location recognition tag.

3. The method of claim 1, wherein the distance information in b) is measured by the camera when an auto focusing operation of the camera is performed.

4. The method of claim 1, wherein the distance information in b) is measured by a distance measuring sensor using infrared rays or ultrasonic waves.

5. The method of claim 1, wherein the location recognition tags are arranged so that a desired precision for using the location recognition tags at a predetermined physical area may be achieved, and the location recognition tags are formed as one-dimensional or two-dimensional barcode types.

6. The method of claim 1, wherein, in e), the mobile terminal location is calculated through a triangulation measuring algorithm by using the distance information, the location information, and the direction information corresponding to the three or more location recognition tags.

7. The method of any one of claim 1 to claim 6, wherein the location recognition tag stores location information of one among an absolute location coordinate and a logic location coordinate.

8. A location recognition device for recognizing a location by using a built-in camera, the location recognition device comprising:
   an image photographing unit for photographing a plurality of location recognition tags that are arranged in a predetermined physical area and respectively store location recognition information, and for performing a digital image process;
   a distance measuring unit for measuring a distance to the location recognition tag;
   an image analyzing unit for analyzing an image of the location recognition tag processed by the image photographing unit, and obtaining corresponding location information and direction information of the location recognition tag; and
   a location recognizing unit for recognizing a user location by using distance information measured by the distance measuring unit, and the location information and the direction information obtained by the image analyzing unit.

9. The location recognition device of claim 8, further comprising a distance measuring sensor for measuring a distance to the location recognition tag by using infrared rays or ultrasonic waves.

10. The location recognition device of claim 8, further comprising a tag location information storage unit for storing location coordinate information of a location of the location recognition tag, and logic location coordinate information corresponding to the location coordinate information.

11. The location recognition device of claim 8 or claim 10, wherein the location recognizing unit transmits the information obtained by the image analyzing unit to an external location managing server, receives location information calculated by the external location managing server, and recognizes a user location.

12. The location recognition device of claim 8 or claim 10, wherein, when the image photographing unit photographs three or more location recognition tags from one position, the location recognition unit recognizes the user location through a triangular measuring algorithm by using the distance information of the distances to the three or more location recognition tags measured by the distance measuring unit and the location and direction information of the three or more locations and directions obtained by the image analyzing unit.

* * * * *